United States Patent [19]

Witt

[11] Patent Number: 4,626,232
[45] Date of Patent: * Dec. 2, 1986

[54] BELT CONSTRUCTION AND METHOD OF MAKING THE SAME

[75] Inventor: Richard J. Witt, Springfield, Mo.
[73] Assignee: Dayco Corporation, Dayton, Ohio
[*] Notice: The portion of the term of this patent subsequent to Oct. 14, 2003 has been disclaimed.
[21] Appl. No.: 659,159
[22] Filed: Oct. 9, 1984
[51] Int. Cl.[4] .................... B29H 7/22; F16G 1/00
[52] U.S. Cl. .......................... 474/205; 156/138; 474/250
[58] Field of Search ............... 156/137, 140, 141, 311, 156/130.5, 323, 86; 474/205, 250; 264/348, 347, 327, 326

[56] References Cited

U.S. PATENT DOCUMENTS

| | | | |
|---|---|---|---|
| 3,078,206 | 2/1963 | Skura | 156/140 |
| 3,250,653 | 5/1966 | Geist et al. | 156/138 |
| 3,535,946 | 10/1970 | Miller | 74/232 |
| 4,104,098 | 8/1978 | Hush et al. | 156/149 |
| 4,235,119 | 11/1980 | Wetzel | 474/205 |
| 4,405,555 | 9/1983 | Esidi et al. | 264/327 |
| 4,414,047 | 11/1983 | Wetzel et al. | 156/138 |
| 4,445,879 | 5/1984 | Cicognani | 474/205 |
| 4,504,342 | 3/1985 | Marsh et al. | 156/138 |

Primary Examiner—Michael Ball
Attorney, Agent, or Firm—Joseph V. Tassone

[57] ABSTRACT

A belt construction and method of making the same are provided, the belt construction having opposed sides and comprising a tensile unit intermediate the opposed sides, a plurality of teeth defining one of the opposed sides of the belt construction and being mainly formed of a first polymeric material that has reinforcing fibers therein, each tooth having opposed sides that are disposed in spaced relation to adjacent sides of adjacent teeth, the belt construction having a land area between adjacent teeth, and a backing member defining the other of the opposed sides of the belt construction, the backing member being mainly formed from a second polymeric material that is initially separate from the material of the teeth. The method comprises the steps of providing a grooved drum, disposing the tensile unit about said drum, then disposing the first polymeric material in a non-cured form thereof about the tensile unit, then subjecting the drum to heat and pressure to cause the first material to be forced toward the drum and exude through the tensile unit adjacent the grooves and into the grooves to at least partially form the teeth, then substantially immediately cooling the first material and the drum to stop the curing of the first material so that the first material is generally in a non-cured condition, then disposing the second material in a non-cured form thereof about the tensile unit, and then again subjecting the drum to heat and pressure to cause the first and second material to be forced toward the drum to complete any remaining unfinished portion of the teeth and be cured together to form the belt construction.

20 Claims, 9 Drawing Figures

BELT CONSTRUCTION AND METHOD OF MAKING THE SAME

BACKGROUND OF THE INVENTION

1. Field of the Invention

This invention relates to an improved belt construction and to a method of making the same.

2. Prior Art Statement

It is known to make a belt construction having opposed sides and comprising a tensile means intermediate the opposed sides, a plurality of teeth defining one of the opposed sides of the belt construction and being mainly formed of a first polymeric material that has reinforcing fibers therein, each tooth having opposed sides that are disposed in spaced relation to adjacent sides of adjacent teeth, the belt construction having a land area between adjacent teeth, and a backing member defining the other of the opposed sides of the belt construction, the backing member being mainly formed from a second polymeric material that is initially separate from the material of the teeth, the method comprising the steps of providing a grooved drum, disposing the tensile means about the drum, then disposing the first polymeric material in a non-cured form thereof about the tensile means, and then subjecting the drum to heat and pressure to cause the first material to be forced toward the drum and exude through the tensile means adjacent the grooves and into the grooves to at least partially form the teeth. For example, see the U.S. Pat. No. 3,078,206 to Skura; the U.S. Pat. No. 3,535,946 to Miller, and the copending patent application of Richard L. Marsh et al, Ser. No. 502,777, filed June 9, 1983.

It is also known to applicant to make a belt construction by a method comprising the steps of providing a grooved drum, disposing the first polymeric material in a non-cured form thereof about the drum, then subjecting the drum with the first material thereon to heat and pressure to cause the first material to be forced toward the drum and exude into the grooves to at least partially form the teeth of the belt construction, then substantially immediately force cooling the first material and the drum to a certain temperature to stop the curing of the first material so that the first material is generally in a less cured condition thereof than a cured condition thereof if the drum with the first material thereon had been permitted to cool to the certain temperature at a normal rate by being disposed in a substantially static air of substantially normal room temperature, then disposing the second material in a non-cured form thereof about the first material on the drum, and then subjecting the drum with the first and second materials thereon to heat and pressure to cause the first and second materials to be forced toward the drum to complete any remaining unfinished portion of the teeth and be cured together to form the belt construction. For example, see the copending patent application of Robert E. Wetzel et al, Ser. No. 658,832, filed Oct. 9, 1984, which patent application is assigned to the same assignee as to whom this patent application is assigned.

It is also known to form toothed belt constructions in separate stages on a grooved drum. For exaple, see the U.S. Pat. No. 3,250,653 to Geist et al; and the U.S. Pat. No. 4,235,119 to Wetzel.

While certain of the above-mentioned items form the various layers of a toothed belt construction of different polymeric materials, also see the U.S. Pat. No. 4,445,879 to Cicognani, for another such multi-layered toothed belt construction.

SUMMARY OF THE INVENTION

It is one feature of this invention to provide an improved toothed belt construction wherein the polymeric material forming the teeth thereof is effectively bonded to the polymeric material forming the backing member thereof while having fully formed teeth.

In particular, it was found according to the teachings of this invention that when forcing under heat and pressure a non-cured polymeric material that has reinforcing fiber members therein through a tensile means into the grooves of a grooved drum to form the teeth of a toothed belt construction, it was desired to prevent that material from substantially curing during such forming operation so that the same will subsequently effectively bond to the polymeric material of a backing member subsequently disposed thereagainst and still permit the backing material to be forced toward the drum with sufficient heat and pressure to completely form the teeth in the grooves of the drum.

It was found according to the teachings of this invention that such curing could be substantially eliminated if the stop curing cooling method of the aforementioned copending patent application of Robert E. Wetzel et al, Ser. No. 658,832, filed Oct. 9, 1984 was utilized, i.e., that substantially immediately after the step of subjecting the drum with the first material thereon to heat and pressure to cause the first polymeric material to be forced toward the drum and exude through the tensile means adjacent the grooves into the grooves to at least partially form the teeth, the first material and the drum are force cooled to a certain temperature to stop the curing of the first material so that the first material is generally in a less cured condition thereon than a cured condition thereof if the drum with the first material and the tensile means thereon had been permitted to cool to the certain temperature at a normal rate by being disposed in substantially static air of substantially normal room temperature; when the second material in a non-cured form thereof is disposed about the tensile means and subsequently subjected to heat and pressure.

For example, one embodiment of this invention provides a method of making a belt construction having opposed sides and comprising a tensile means intermediate the opposed sides, a plurality of teeth defining one of the opposed sides of the belt construction and being mainly formed of a first polymeric material that has reinforcing fibers therein, each tooth having opposed sides that are disposed in spaced relation to adjacent sides of adjacent teeth, and a backing member defining the other of the opposed sides of the belt construction, the backing member being mainly formed from a second polymeric material that is initially separate from the material of the teeth, the method comprising the steps of providing a grooved drum, disposing the tensile means about the drum, then disposing the first polymeric material in a non-cured form thereof about the tensile means, then subjecting the drum with the first material thereon to heat and pressure to cause the first material to be forced toward the drum and exude through the tensile means adjacent the grooves and into the grooves to at least partially form the teeth, then substantially immediately force cooling the first material and the drum to a certain temperature to stop the curing of the first material so that the first material is generally in a less cured condition thereof than a cured condition thereof if the drum with the first material and the tensile means thereon had been permitted to cool to the certain temperature at a normal rate by being disposed in substantially static air of substantially normal room temperature, then disposing the second material in a non-cured form about the tensile means, and then subjecting the drum with the first and second materials thereon to heat and pressure to cause the first and second materials to be forced toward the drum to complete any remaining unfinished portion of the teeth and be cured together to form the belt construction.

Accordingly, it is an object of this invention to provide an improved belt construction having one or more of the novel features of this invention as set forth above or hereinafter shown or described.

Another object of this invention is to provide an improved method of making such a belt construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

While the various features of this invention are hereinafter illustrated and described as being particularly adapted to provide a toothed belt construction formed of particular materials and with a particular tooth profile, it is to be understood that the various features of this invention can be utilized singly or in various combinations thereof to provide belt constructions formed of other materials and with other tooth profiles as desired.

Further, while the various features of this invention are hereinafter illustrated and described as being particularly adapted to provide a belt construction in sleeve form which is adapted thereafter to be cut into individual endless belts in a conventional manner, it is to be understood that the various features of this invention can be utilized singly or in various combinations thereof to provide a belt construction which itself merely comprises one endless belt, if desired.

Therefore, this invention is not to be limited to only the embodiment illustrated in the drawings, because the drawings are merely utilized to illustrate one of the wide variety of uses of this invention.

Figure 1:
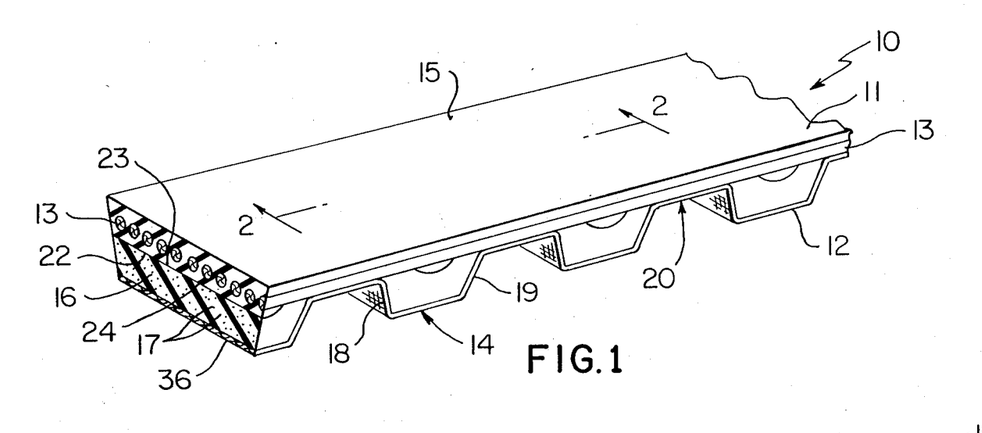
FIG. 1 is a fragmentary perspective view of the improved belt construction of this invention.
Figure 2:
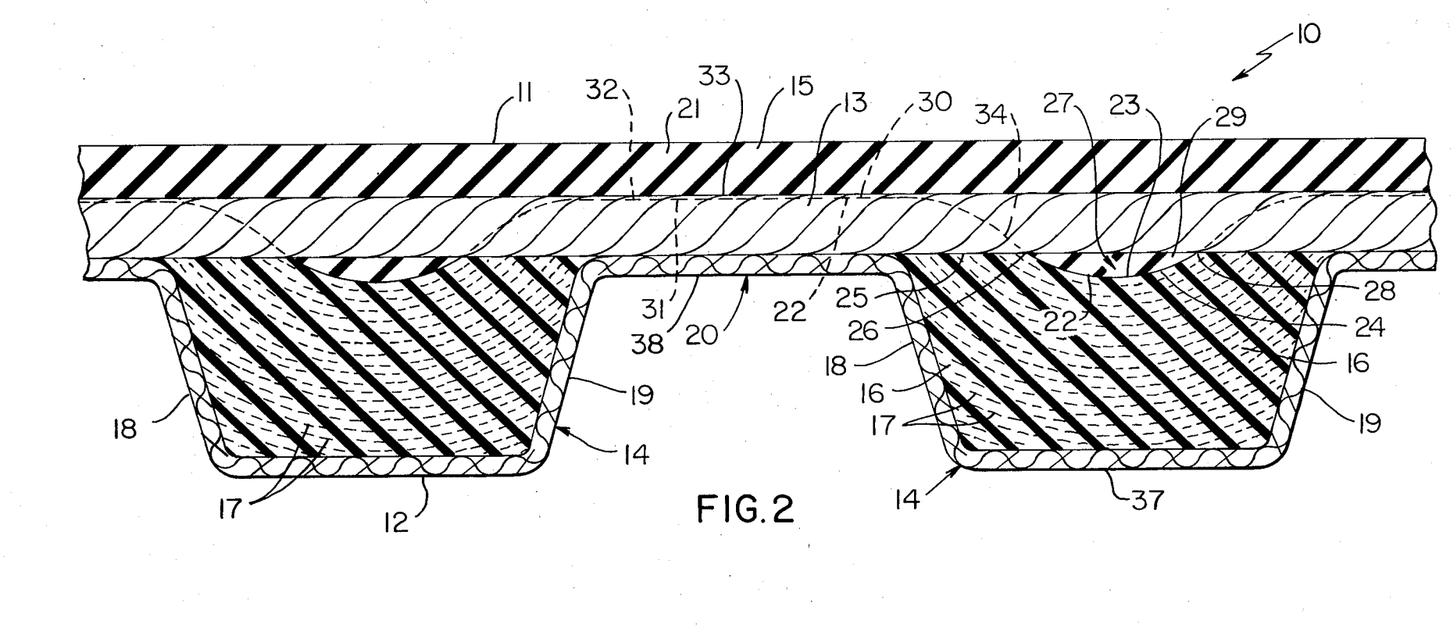
FIG. 2 is an enlarged, fragmentary cross-sectional view of the belt construction of FIG. 1 and is taken on the line 2—2 thereof.

Referring now to FIGS. 1 and 2, the improved belt construction of this invention is generally indicated by the reference numeral 10, the belt construction 10 having opposed sides 11 and 12 and comprising a tensile section or means 13 disposed intermediate the opposed sides 11 and 12, a plurality of teeth that are generally indicated by the reference numeral 14 and defining the side 12 of the belt construction 10, and a backing member 15 defining the side 11 of the belt construction 10.

While the tensile section or means 13 of the belt construction 10 can comprise any suitable structure, the embodiment thereof illustrated in the drawings comprises a plurality of side-by-side cords or strands formed of a suitable substantially non-stretchable material in a manner conventional in the belt-making art as will be apparent hereinafter and therefore the terms "tensile means" will be hereinafter utilized for describing the tensile section 13 of the belt construction 10.

The teeth 14 of the belt construction 10 are mainly formed of a first polymeric material 16 that has reinforcing fibers 17 therein, each tooth 14 having opposed sides 18 and 19 that are disposed in spaced relation to adjacent sides 19 and 18 of adjacent teeth 14. The sides 18 and 19 of each tooth 14 are shown as being flat and angled relative to the longitudinal axis of the belt construction 10 that is disposed parallel to the tensile means 13 and can comprise the driving or driven parts of the teeth 14 in a manner well known in the art. However, it is to be understood that the cross-sectional configuration of the teeth 14 can have any other suitable profile rather than being substantially trapezoidal as illustrated in FIGS. 1 and 2, if desired.

The belt construction 10 has land areas that are generally indicated by the reference numeral 20 in FIGS. 1 and 2 and are respectively disposed between adjacent teeth 14 as is conventional in the art.

The backing member 15 of the belt construction 10 is mainly formed from a second polymeric material 21 that is initially separate from the material 16 of the teeth 14 and can be substantially free of reinforcing fibers therein if desired and as illustrated in the drawings, the material 21 of the backing member 15 having a surface 22 that joins with a surface 23 of each tooth 14 whereby the joining surfaces 22 and 23 define an interface line 24 therebetween.

The interface line 24 for each tooth 14 extends from one side 25 of the tensile means 13 at a point 26 inboard of the opposed side 18 of the respective tooth 14 into the medial portion of the respective tooth 14 that is generally indicated by the reference numeral 27 and then back to the side 25 of the tensile means 13 at a point 28 that is inboard of the other opposed side 19 of the respective tooth 14. In this manner, a part 29 of the material 21 of the backing member 15 defines part of the medial portion 27 of each tooth 14.

The interface line 24 for each tooth 14 is substantially arcuate between the points 26 and 28 thereof in a manner similar to the interface line for each tooth of the belt construction set forth in the aforementioned U.S. Pat. No. 4,235,119 to Wetzel, and the aforementioned copending patent application of Richard L. Marsh et al, Ser. No. 502,777, filed June 9, 1983, whereby this patent and this copending patent application are being incorporated into this disclosure by this reference thereto.

The surface 22 of the backing member 15 also joins with a surface 30 of the first material 16 in each land area 20 whereby the joining surfaces 22 and 30 in each land area 30 define an interface line 31 therebetween.

The interface line 31 in each land area 20 of the belt construction 10 of this invention can be disposed substantially adjacent the side 33 of the tensile means 13 as illustrated in FIG. 2 or could extend spaced from that side 33 toward the side 11 of the belt construction of FIG. 1 as in the aforementioned patent application of Richard L. Marsh et al, Ser. No. 502,777, filed June 9, 1983, or be disposed intermediate the two sides 25 and 33 of the tensile means 13 depending upon the original thickness of the first material 16 utilized to form the belt construction 10 as will be apparent hereinafter. In this same vein, the interface line 24 between the materials 16 and 21 in the medial portion 27 of each tooth 14 could be disposed completely intermediate the sides 25 and 33 of the tensile means 13, be substantially even with the side 33 of the tensile means 13 or be intermediate the side 33 of the tensile means 13 and the side 11 of the belt construction 10, again depending upon the initial thickness of the material 16 being utilized and the degree of completeness of the teeth 14 during a first forming step of applying heat and pressure to initially form the teeth 14 as will be apparent hereinafter.

In any event, it can be seen that the interface line 24 for each tooth 14 of the belt construction 10 of this invention, as well as the major portion 32 of the interface line 31 for each land area 20 of the belt construction 10, is disposed spaced from the side 25 of the tensile means 13 so as to tend to remove any tendency of a shearing effect to take place at the interface lines 24 and 31 along the side 25 of the tensile means 13 as the only portions 34 of the interface lines 34 and 31 between the materials 16 and 21 that actually cross the side 25 of the tensile means 13 are disposed at an angle relative to the side 25 of the tensile means 13 and, thus, would tend to oppose any shearing forces being applied to the teeth 14 during the driving or driven operation of the belt construction 10 in a manner that is well known in the art.

Further, it can be seen that substantially the entire portion of the teeth 14 of the belt construction 10 disposed below the side 25 of the tensile means 13 have the reinforcing fibers 17 therein which tend to prevent and/or oppose a shearing force from shearing the teeth 14 from the belt construction 10. Thus, such a belt construction 10 is particularly adapted for being a synchronous belt as will be apparent hereinafter.

If desired, a conventional reinforcing fabric material 36 can be utilized to cover the opposed sides 18 and 19 of each tooth 14 as well as cover the bottom surface 37 of each tooth 14 and the bottom surface 38 of each land area 20 as illustrated in FIGS. 1 and 2.

The belt construction 10 illustrated in FIGS. 1 and 2 and previously described is formed by utilizing a method and apparatus of this invention that is similar to, but uniquely different from, the method and apparatus disclosed and described in the aforementioned U.S. Pat. No. 3,078,206; to Skura, and the aforementioned U.S. Pat. No. 3,535,946 to Miller, whereby these two patents are being incorporated into this disclosure by this reference thereto.

For example, reference is now made to FIGS. 3 and 4 wherein the method and apparatus of this invention for making the belt construction 10 of FIGS. 1 and 2 is generally indicated by the reference numeral 40 and comprises a metallic drum 41 that has a plurality of longitudinally disposed and spaced apart parallel grooves 42 therein in which the teeth 14 of the belt construction 10 are subsequently formed.

The grooved drum 41 is formed and utilized in substantially the same manner as set forth in the aforementioned U.S. Pat. No. 3,078,206 to Skura, and therefore the details thereof need not be set forth.

When forming the belt construction 10 of this invention, the stretchable fabric cover 36 is first disposed or wrapped about the drum 41 with the opposed ends of the fabric cover 36 either being butt joined or overlapped as desired in a conventional manner.

Thereafter, the tensile means 13 is disposed on top of the fabric cover 36 by suitably winding one or more cords on the fabric covering 36 with adjacent turns 44 of the tensile means 13 being spaced from each other the desired distance or combination of distances, FIG. 3 merely being a schematic showing of such spacing which will permit the polymeric material 16 and 21 to exude therethrough as will be apparent hereinafter Thereafter, a layer of the first polymeric material 16 in a non-cured form thereof is disposed or wrapped about the drum 41 on top of the tensile means 13 and has the opposed ends 45 and 46 thereof disposed in abutting relation as represented by the butt line 47 in FIG. 3.

Figure 3:
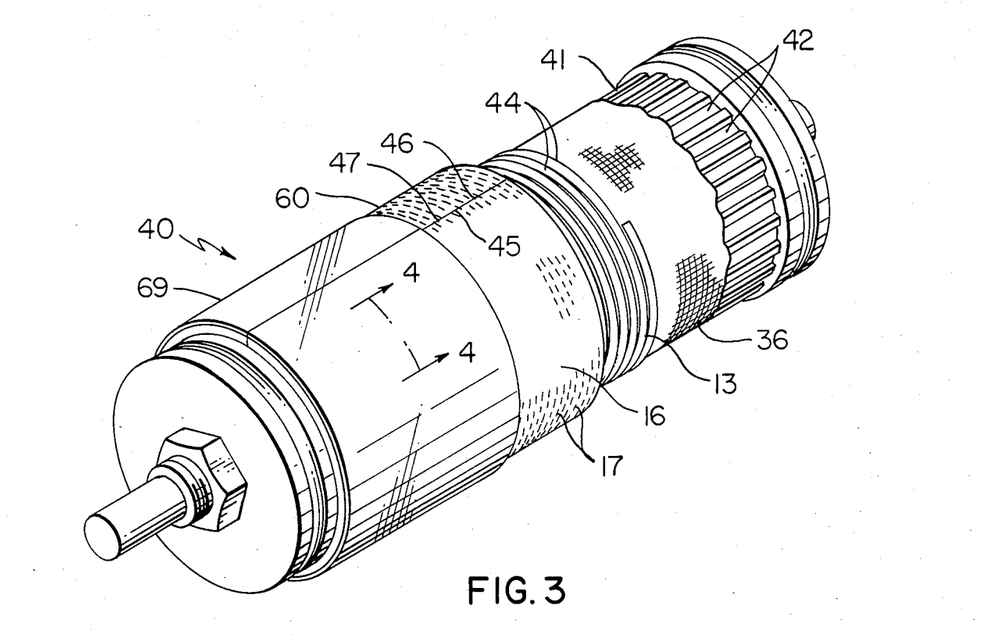
FIG. 3 is a schematic broken-away perspective view illustrating part of the apparatus and method of this invention for forming the belt construction of FIG. 1.

While the fibers 17 in the polymeric material 16 can be randomly and homogeneously disposed therein, it is also possible that the fibers 17 can be oriented throughout the material 16 and in the embodiment illustrated in the drawings, the fibers 17 in the material 16 have been oriented so that their long dimensions will mainly extend in a direction between the opposed sides 18 and 19 of each tooth 14 as illustrated in FIG. 2 and, therefore, are disposed in a direction that is transverse to the longitudinal axis of the drum 41 as illustrated in FIG. 3.

Figure 4:
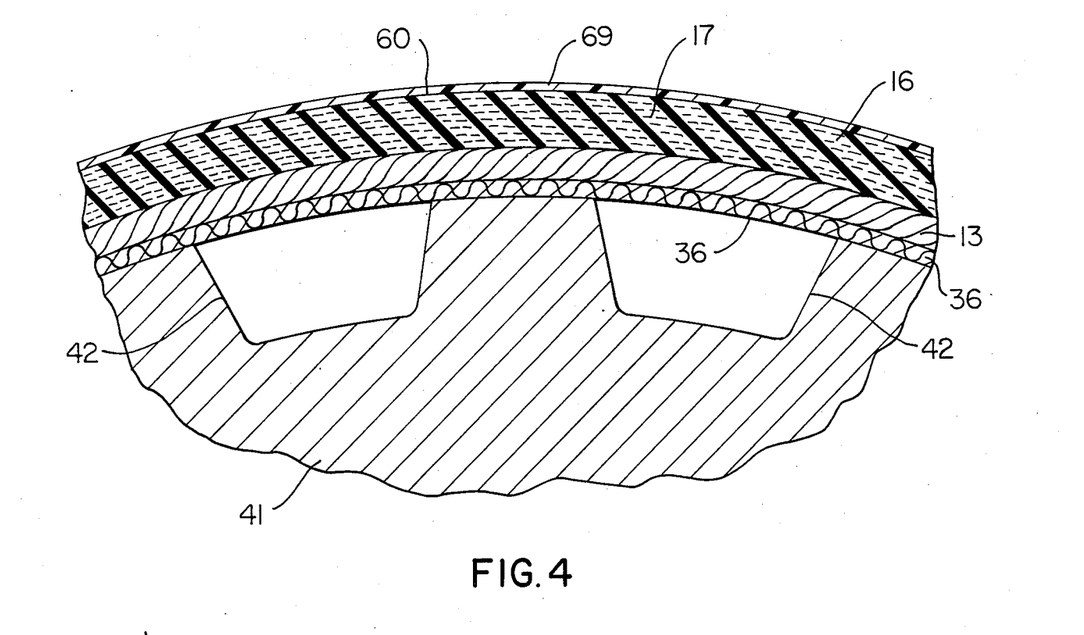
FIG. 4 is an enlarged fragmentary cross-sectional view taken on the line 4—4 of FIG. 3, FIG. 4 illustrating one step in the method of this invention for forming the belt construction of FIG. 1.
Figure 5:
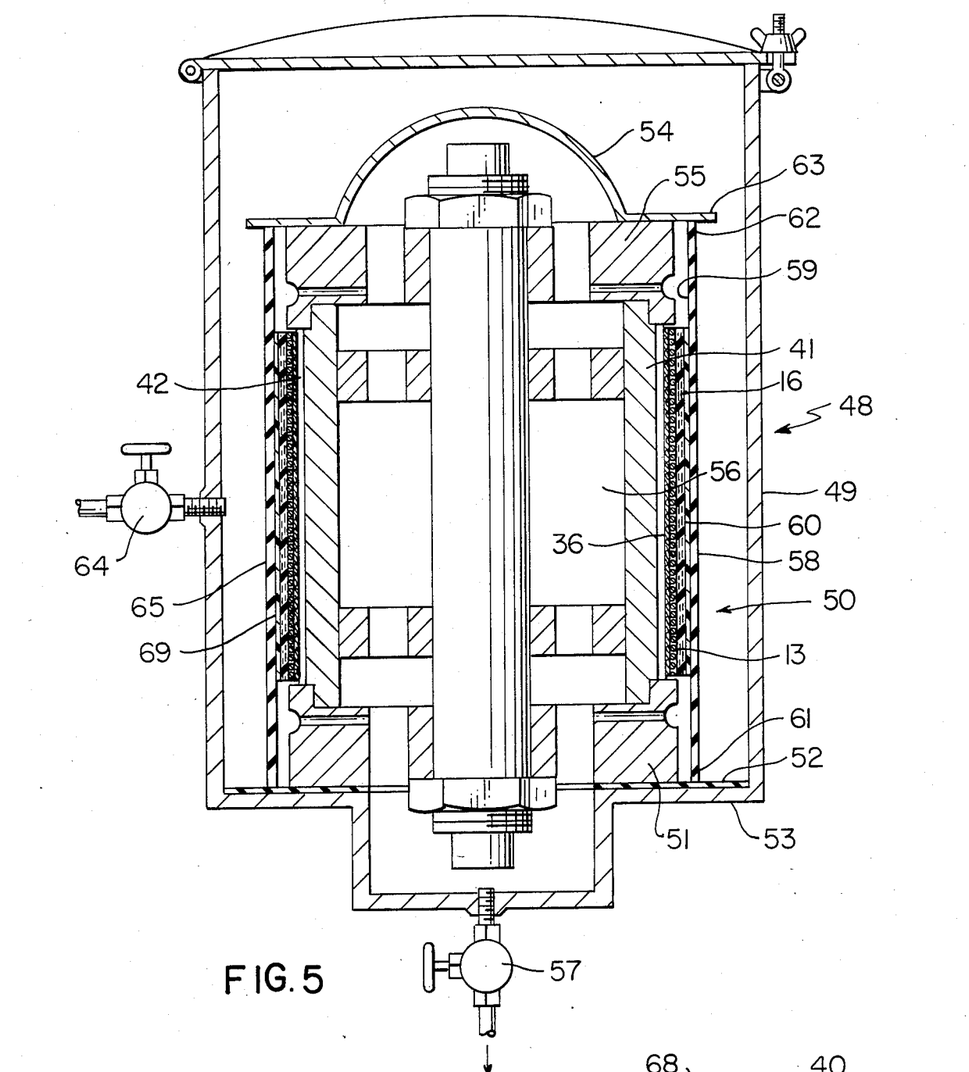
FIG. 5 is a cross-sectional view illustrating the apparatus of FIG. 3 disposed in another apparatus that applies heat and pressure to the apparatus of FIG. 3 in various steps to form the belt construction of this invention.

After the parts 36, 13 and 16 of the belt construction 10 have been disposed in the wrapped around condition on the drum 41 as illustrated in FIGS. 3 and 4, such assembly is disposed in the apparatus that is generally indicated by the reference numeral 48 in FIG. 5 and comprises a container 49 having a chamber 50 therein. One end 51 of the drum 41 may rest against a resilient sealing gasket means 52 disposed on an end wall 53 of the container 49 and a removable closure member 54 is disposed against the other end 55 of the drum 41 so that the interior 56 of the drum 41 can have steam injected therein and/or be vented through a valve means 57. A flexible diaphragm 58 in cylinder form is disposed about the drum 41 and has its inner surface 59 disposed against the outer surface 60 of the polymeric material 16 while its opposed ends 61 and 62 are respectively disposed in substantial sealing engagement with the end gasket 52 and an outwardly extending flange 63 of the cover means 54. In this manner, the flexible diaphragm 58 is adapted to force the material 16 toward the drum 41 when steam under a suitable pressure is directed into the chamber 50 of the container 49 through suitable valve means 64 to act on the exterior 65 of the diaphragm 58 in a manner fully set forth in the aforementioned U.S. Pat. No. 3,078,206, to Skura.

Figure 6:
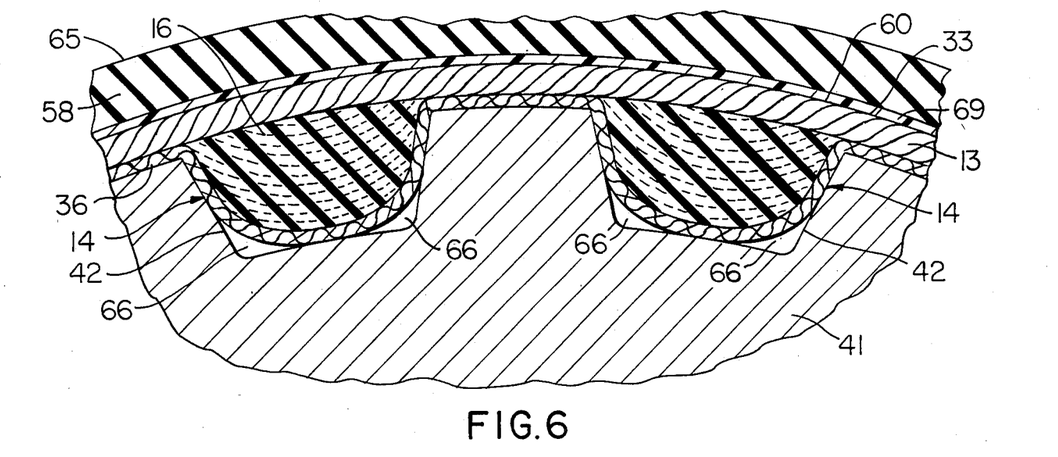
FIG. 6 is a view similar to FIG. 4 and illustrates the portion of the belt construction of this invention that has been formed from the arrangement illustrated in FIG. 4.

The steam that is directed into the interior 56 of the drum 41, if used, has a pressure value that is less than the pressure value of the steam that is directed into the chamber 50 through the valve means 64 so that the resulting pressure differential betweeen the interior 56 and the exterior 50 of the diaphragm 58 and the diaphragm 58 to force the material 16 toward the drum 41 and since the material 16, as well as the fabric 36, has been heated by the steam, the same exudes toward the drum 41 and causes the material 16 to exude through the tensile means 13 into the grooves 42 to at least partially form the teeth 14 in the manner illustrated in FIG. 6 wherein unfilled gaps 66 of the grooves 42 remain when the diaphragm 58 come to rest against the top surface 33 of the tensile means 13 as illustrated in FIG. 6.

Figure 7:
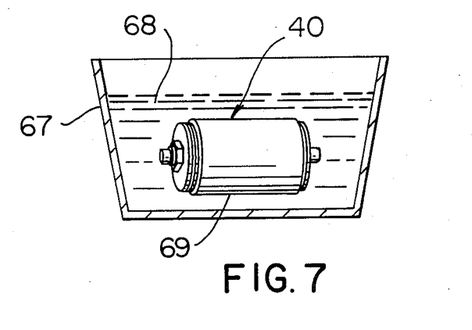
FIG. 7 is a schematic view illustrating how the drum and belt arrangement of FIG. 6 are cooled after the same have been removed from the apparatus of FIG. 5.

At this time, the heat required to permit the material 16 and cover 36 to exude into the grooves 42 of the drum 41 is sufficiently high so that the same will begin to cause the material 16 to begin to cure so that it is desired to substantially immediately cool the drum 41, material 16, tensile means 13 and cover 36 and this is accomplished by removing the drum 41 with the material 16, tensile means 13 and cover 36 in the condition illiustrated in FIG. 6 and dispose the same in a cooling bath that is generally indicated by the reference numeral 67 in FIG. 7. The cooling bath 67 immediately reduces the temperature of the drum 41, material 16, tensile means 13 and cover 36 to at least a temperature where the aforementioned curing operation immediately stops so that the material 16, tensile means 13 and cover 36 will now be at generally a non-cured condition thereof as fully set forth in the aforementioned copending patent application of Robert E. Wetzel et al, Ser. No. 658,832, filed Oct. 9, 1984, whereby this copending patent application is being incorporated into this disclosure by this reference thereto.

For example, it is believed that the temperature of the material 16, tensile means 13, cover 36 and drum 41 can be lowered to approximately 140° F. to substantially stop the aforementioned curing operation. Of course, the temperature can be lowered to a temperature lower than 140° F., if desired.

While the bath 67 can have any suitable cooling fluid 68 therein, the same can comprise water that is normally maintained at room temperature.

Once the drum 41 and its associated means 16, 13 and 36 have been cooled in the above manner, the water on the exterior surface 60 of the material 16 is removed in any suitable manner, such as by blowing hot air on the same, etc. In this manner, the surface 60 is sufficiently dried so that a subsequent securement of the layer of material 15 thereto can take place as will be apparent hereinafter.

However, it is believed according to the teachings of this invention that in order to prevent contamination of the material 16 during the previously described heating and pressing operation, a suitable sheet means can be disposed or wrapped about the material 16 against the surface 60 thereof to completely cover the material 16 before the drum 41 is placed in the container 49.

For example, such sheet of material is indicated by the reference numeral 69 in FIGS. 3 and 4 and even remains on the drum 41 when the drum 41 is disposed in the cooling bath 67 of FIG. 7.

While the sheet of material 69 can be any suitable material, the same can be a heat-shrinkable sheet of material such as a nylon fabric, a polyolefin, etc. Of course, the sheet of material 69 could be a non-shrinkable sheet of material and could comprise a plastic sheet, such as Mylar, etc. or could comprise a metallic foil, such as aluminum foil, etc. Also, the sheet of material 69 can comprise overlapping or abutting layers of a tape or tapes of such material.

In any event, the sheet of material 69 is utilized for the purpose of preventing contamination of the material 16 on the drum 41 as well as to provide a better surface 60 on the material 16 for the material 15 to adhere thereto.

Figure 8:
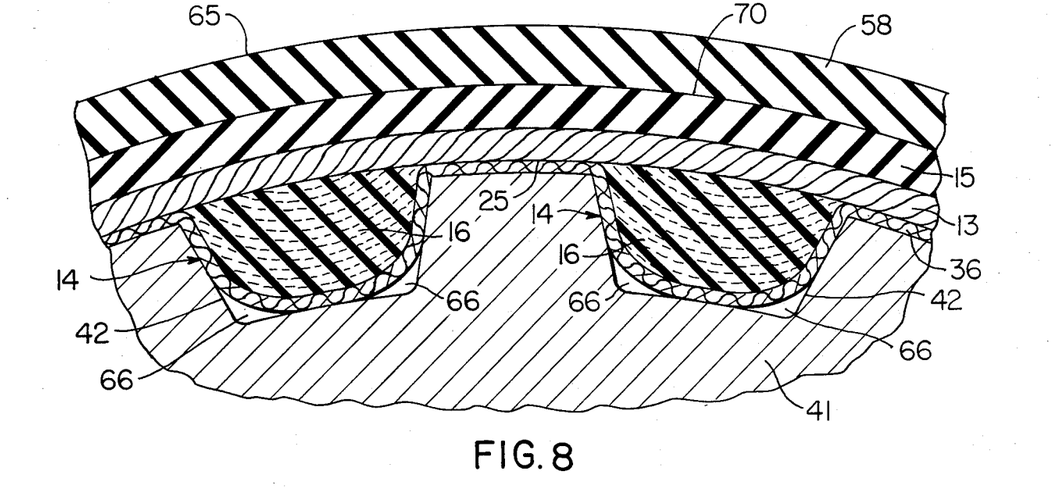
FIG. 8 is a view similar to FIG. 6 and illustrates another step in the method of this invention for forming the belt construction of FIG. 1.

When the sheet of material 69 is utilized in the above manner, the sheet of material 69 is removed from the drum 41 after the cooling operation illustrated in FIG. 7 has taken place and any residual water that is remaining on the drum 41 is removed in the manner previously set forth. Subsequently, the layer of material 15 in a non-cured form thereof is now disposed or wrapped on top of the tensile means 13 in the manner illustrated in FIG. 8 and then the drum 41 with the material 15 thereon in the manner illustrated in FIG. 8 is disposed back into the container 49. The diaphragm 58 is now disposed against the outer surface 70 of the material 15 so that a subsequent heating and pressing operation can be provided in the container 49 to cause the materials 15 and 16, as well as the cover material 36, to be forced toward the drum 41 to cause the material 16 and cover 36 to substantially fill out all remaining voids 66 in the grooves 42 to completely form the teeth 14. In addition, the heat and pressure is maintained in the container 49 for a sufficient period of time to cause the material 16 and 15 to cure together and form the interface line 24 previously set forth. Also, at this time, the cover 36 fully bonds to the material 16 of the teeth 14.

It is believed according to the teachings of this invention that since the material 16 is in generally a non-cured condition, as well as the cover 36, when the material 15 is being forced against the same to complete the forming of the teeth 14, the material 15 will not exude into the middle portion of each tooth 14 below the side 25 of the tensile means 13 to too great of a distance, it at all, to thereby assure that a sufficient amount of fibers 17 are provided in each tooth 4 to prevent shearing thereof during subsequent use of the resulting belt construction 10. It is believed that if the material 16 and/or cover 36 had been in a more cured condition thereof when the material 15 is forced thereagainst the cured material would have prevented the complete formation of the teeth 14. Also, it is believed that the material 15 bonds or adheres to the material 16 to a greater degree when the material 16 is in a generally non-cured condition than when the same is in a more cured condition at the time the material 15 is being heated and pressed against the material 16 for this purpose.

Figure 9:
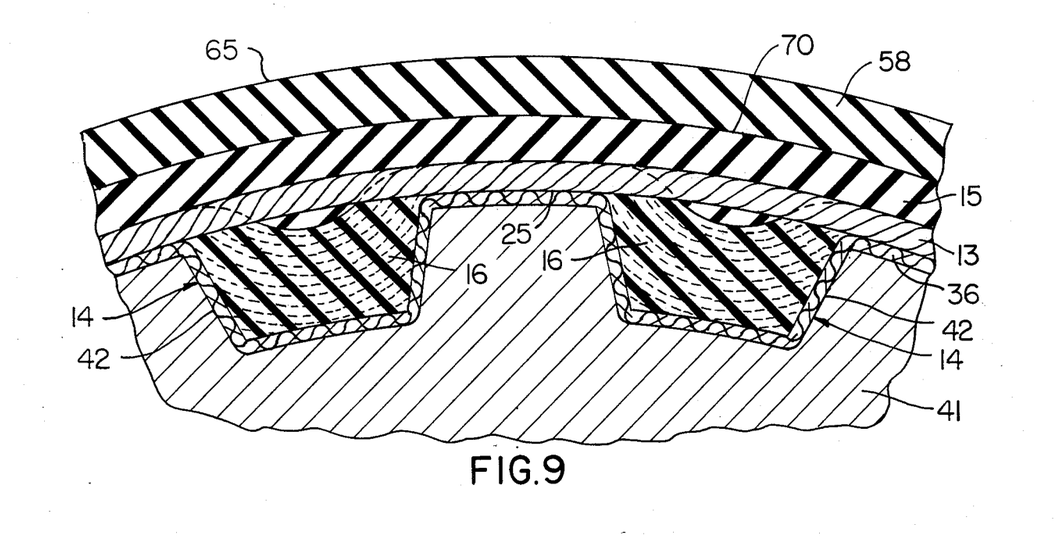
FIG. 9 is a view similar to FIG. 8 and illustrates the apparatus of FIG. 8 after the step of applying heat and pressure thereof to final form the belt construction of this invention.

Once the materials 15, 16 and 36 have been completely cured in the manner previously set forth, the drum 41 is removed from the container 49 and the belt construction 10 is then removed from the drum 41 and further processed in a conventional manner.

For example, if the belt construction 10 comprises an elongated belt sleeve as previously described and illustrated in the drawings, the same can be cut into the individual endless belts in a conventional manner whereby such operation need not be further described.

Therefore, it can be seen that this invention not only provides an improved belt construction, but also this invention provides an improved method of making such a belt construction.

While the particular material of the belt construction 10 of this invention can be selected so that the same will provide a suitable belt construction 10 when made according to the method of this invention, one such belt construction that has been successfully made by this invention comprises a synchronous belt for an automotive cam shaft drive. Such belt has a thickness of approximately 0.180 of an inch (the back side thereof having been slightly ground to even the surface thereof for driving purposes), each tooth 14 having a base width of approximately 0.128 of an inch, a depth of approximately 0.075 of an inch, each side 18 and 19 being angled at approximately 20 degrees relative to the center line of the respective tooth 14, a root radius of approximately 0.020 of an inch and a bottom radium of approximately 0.020 of an inch. The polymeric material 16 of such belt comprises a neoprene rubber loaded with nylon fibers of relatively short length, and being approximately 20 parts fiber per 100 parts rubber (20 PHR), such fibers having a diameter in the approximate range of 0.001 to 0.050 of an inch and a length in the approximate range of 0.001 of an inch to as much as 1 inch, the material 16 having a Mooney minimum of approximately 13.8 at 275° F. and an original gauge or thickness of approximately 0.065 of an inch. The material 15 of such belt comprises a neoprene gum stock which is substantially free of fibers therein and has a Mooney minimum of approximately 9 at 275° F. with an original gauge or thickness of approximately 0.050 of an inch. The fabric cover 36 for such belt is a stretchable RFL (resorcinal formaldehyde latex) treated nylon fabric which has a raw fabric weight of approximately 6½ ounces per square yard thereof. It was found that the nylon fabric required an RFL treatment so as to have a lower curing rate over the other latex-coated fabric material so that the teeth 14 will fully form according to the teachings of this invention in the manner previously set forth. The tensile means 13 for such a belt construction comprises a fiberglass cord ECG150 3/13 having a diameter of approximately 0.045 of an inch and such cord is wrapped so as to provide approximately 18 cords per inch across the face of the drum 41.

When forming such a belt construction, the drum 41 and its associated materials 69, 16, 13 and 36 utilize approximately a 5 minute warmup time in the tank 49 wherein the steam pressure inside the drum 41 is approximately 30 psi and the stem pressure outside the drum 41 is approximately 135 psi. This is followed by approximately a 5 minute forming cycle of heat and pressure wherein just an outside steam pressure of approximately 135 psi is utilized with the inside pressure being substantially 0. The drum 41 and its associated materials 69, 16, 13 and 36 is then placed in the cooling bath 67 for approximately 10 minutes. Thereafter, the final curing operation of the cooled drum 41 in the tank 49 with the sheet means 69 removed and the material 15 applied has an outside steam pressure of approximately 135 psi and an inside pressure of approximately 30 psi for about 5 minutes followed by the outside steam pressure being approximately 135 psi and the inside steam pressure being approximately 0 psi for about 10 minutes followed by the outside steam pressure being approximately 135 psi and the inside pressure being approximately 70 psi for about 38 minutes whereby the final cure time is about 53 minutes.

Therefore, it can be seen that by following the teachings of this invention a high modulus high Mooney compound can be successfully formed into a synchronous belt by performing the teeth through a tensile means spun on a mold or drum before the application of a gummed backing material.

For example, in the aforementioned example, the high modulus material 16, approximately 5,000 psi at 50% elongation, was made to make a synchronous belt for automotive cam shaft drives and tests show a torque improvement from approximately 35% to approximately 54% over standard cam shaft belts and a life improvement that averaged approximately 241 hours compared to approximately 6.3 hours for standard cam shaft belts.

It is to be understood that the above specific example of a particular belt construction 10 formed according to the teachings of this invention is not to be a limitation on this invention but is merely for the purpose of illustrating how one such belt construction was formed according to the teachings of this invention.

For example, it is believed that other high modulus materials, such as thermoplastic materials, could be utilized in combination with backing members of lower modulus material in the method of this invention to form toothed belt constructions. Of course each material would probably need different forming times, temperatures and pressures.

Therefore, it can be seen that this invention not only provides an improved belt construction, but also this invention provides an improved method of making such a belt construction or the like.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a belt construction having opposed sides and comprising a tensile means intermediate said opposed sides, a plurality of teeth defining one of said opposed sides of said belt construction and being mainly formed of a first polymeric material that has reinforcing fibers therein, each tooth having opposed sides that are disposed in spaced relation to adjacent sides of adjacent teeth, said belt construction having a land area between adjacent teeth, and a backing member defining the other of said opposed sides of said belt construction, said backing member being mainly formed from a second polymeric material that is initially separate from said material of said teeth, said method comprising the steps of providing a grooved drum, disposing said tensile means about said drum, then disposing said first polymeric material in a noncured form thereof about said tensile means, and then subjecting said drum with said first material and said tensile means thereon to heat and pressure to cause said first material to be forced toward said drum and exude through said tensile means adjacent said grooves and into said grooves to at least partially form said teeth, the improvement comprising the steps of then substantially immediately force cooling said first material and said drum to a certain temperature to stop the curing of said first material so that said first material is generally in a less cured condition thereof than a cured condition thereof if said drum with said first material and said tensile means thereon had been permitted to cool to said certain temperature at a normal rate by being disposed in substantially static air of substantially normal room temperature, then disposing said second material in a non-cured form thereof about said tensile means on said drum, and then subjecting said drum with said first and second materials and said tensile means thereon to heat and pressure to cause said first and second materials to be forced toward said drum to complete any remaining unfinished portion of said teeth and be cured together to form said belt construction.

2. A method as set forth in claim 1 wherein said step of substantially immediately force cooling said first material and said drum comprises the step of disposing said drum with said first material thereon into a bath of a cooling fluid.

3. A method as set forth in claim 2 wherein said cooling fluid comprises water.

4. A method as set forth in claim 1 wherein said step of substantially immediately force cooling said first material and said drum cools the same to at least approximately 140° F. to substantially stop any further curing of said first material that was started by said step of subjecting said drum to heat and pressure whereby said certain temperature is approximately 140° F.

5. A method as set forth in claim 1 wherein said second material is substantially free of fibers therein.

6. A method as set forth in claim 1 and including the step of disposing a stretchable fabric layer about said drum before said step of disposing said first material about said drum so that said fabric layer will be subsequently forced into said grooves and be bonded to said teeth.

7. A belt construction made by the method of claim 1.

8. In a method of making a belt construction having disposed sides and comprising a tensile means intermediate said opposed sides, a plurality of teeth defining one of said opposed sides of said belt construction and being mainly formed of a first polymeric material that has reinforcing fibers therein, each tooth having opposed sides that are disposed in spaced relation to adjacent sides of adjacent teeth, said belt construction having a land area between adjacent teeth, and a backing member defining the other of said opposed sides of said belt construction, said backing member being mainly formed from a second polymeric material that is initially separate from said material of said teeth, said method comprising the steps of providing a grooved drum, disposing said tensile means about said drum, then disposing said first polymeric material in a non-cured form thereof about said tensile means, and then subjecting said drum with said first material and said tensile means thereon to heat and pressure to cause said first material to be forced toward said drum and exude through said tensile means adjacent said grooves and into said grooves to at least partially form said teeth, the improvement comprising the steps of disposing a sheet means about said first material on said drum before said step of subjecting said drum to heat and pressure, then after said step of subjecting said drum to heat and pressure substantially immediately force cooling said first material and said drum to a certain temperature to stop the curing of said first material so that said first material is generally in a less cured condition thereof than a cured condition thereof if said drum with said first material and said tensile means thereon had been permitted to cool said certain temperature at a normal rate by being disposed in substantially static air of substantially normal room temperature, removing said sheet means, then disposing said second material in a non-cured form thereof about said tensile means on said drum, and then subjecting said drum with said first and second materials and said tensile means thereon to heat and pressure to cause said first and second materials to be forced toward said drum to complete any remaining unfinished portion of said teeth and be cured together to form said belt construction.

9. A method as set forth in claim 8 wherein said sheet means comprises a heat shrinkable sheet means.

10. A method as set forth in claim 9 wherein said heat shrinkable sheet means comprises a nylon fabric.

11. A method as set forth in claim 9 wherein said heat shrinkable sheet means comprises a polyolefin.

12. A method as set forth in claim 8 wherein said sheet means comprises a non-heat shrinkable sheet means.

13. A method as set forth in claim 12 wherein said non-heat shrinkable sheet means comprises a plastic sheet means.

14. A method as set forth in claim 12 wherein said non-heat shrinkable sheet means comprises a metallic foil.

15. A method as set forth in claim 8 wherein said step of substantially immediately force cooling said first material and said drum comprises the step of disposing said drum with said first material thereon into a bath of a cooling fluid.

16. A method as set forth in claim 15 wherein said cooling fluid comprises water.

17. A method as set forth in claim 8 wherein said step of substantially immediately force cooling said first material and said drum cools the same to at least approximately 140° F. to substantially stop any further curing of said first material that was started by said step of subjecting said drum to heat and pressure whereby said certain temperature is approximately 140° F.

18. A method as set forth in claim 8 wherein said second material is substantially free of fibers therein.

19. A method as set forth in claim 8 and including the step of disposing a stretchable fabric layer about said drum before said step of disposing said first material about said drum so that said fabric layer will be subsequently forced into said grooves and be bonded to said teeth.

20. A belt construction made by the method of claim 8.

* * * * *